Patented Sept. 11, 1945

2,384,752

UNITED STATES PATENT OFFICE 2,384,752

MONOAZO DYESTUFFS

Arthur Howard Knight and William Elliot Stephen, Blackley, England, assignors to Imperial Chemical Industries Limited, a corporation of Great Britain No Drawing. Application December 22, 1942, Serial No. 469,844. In Great Britain December 22, 1941

5 Claims. (Cl. 260—199)

The present invention relates to new monoazo acid dyestuffs suitable for the colouring of animal fibres.

According to the invention we make the dyestuffs by diazotising an amine of the general formula X—CO—NY—R—NH$_2$ wherein R designates m- or p-phenylene, optionally substituted by methyl, methoxy, a sulphonic acid group or other simple azo dyestuff substituents, X designates monochloro- or monobromo-alkyl ($C_1$ to $C_3$), and Y designates hydrogen, alkyl ($C_1$ to $C_6$), aralkyl, cycloalkyl, alkoxyalkyl or aryl, and coupling the diazonium compound with a 2-N-acylamino-8-naphthol-6-sulphonic acid, wherein the acyl group is of formula —CO—M, M being an aliphatic hydrocarbon radical ($C_1$ to $C_6$), and the remaining hydrogen of the 2-amino group may be replaced by an alkyl, hydroxyalkyl, or aryl group.

Also according to the invention the dyestuffs are employed in colouring animal fibres, e. g., wool and silk.

The dyestuffs dye wool from an acid dyebath and yield, in general, dyeings of various shades of red or red-brown which are characterised by very good fastness to severe washing and milling and good fastness to light.

As examples of diazo components which can be employed according to the invention, we mention:

4-amino-1-N-ethyl-omega-chloroacetanilide,
4-amino-1-N-isopropyl-omega-chloroacetanilide,
4-amino-1-N-n-butyl-omega-chloroacetanilide,
4-amino-2-N-ethyl-omega-chloroacet-toluidide,
4-amino-2-N-ethyl-omega-bromopropion - toluidide,
3-amino-omega - chloroacetanilide - 4 - sulphonic acid,
2-amino-4-N-ethyl-omega-chloroacet-toluidide,
4-amino-2-N-ethyl-α-bromobutyryl-toluidine,
4-amino-2-N-ethyl-α-bromopropion-toluidide,
4-amino-2- N - ethyl-omega - chloropropiontoluidide,
4-amino-1-N-ethyl-omega-chloropropionanilide,
4-amino-1-N-ethyl-omega-bromopropionanilide,
4-amino-1-N-sec-butyl-omega-chloroacetanilide,
4-amino-omega - chloroacetanilide - 3 - sulphonic acid,
4-amino-2-N-ethyl-omega-chloroacetanisidide,
4-amino-1-N-n-butyl- omega - chloroacetanilide-2-sulphonic acid,
4-amino-1-N-ethyl-omega-bromoacetanilide,
4-amino-1-N-benzyl-omega-chloro-acetanilide,
4-amino-1-N-cyclohexyl - omega - chloroacetanilide,
5-amino-2-N-cyclohexyl-omega-chloroacet-toluidide,
3-amino-1-N-benzyl-omega-chloroacetanilide,
4-amino-2-N-benzyl-omega-chloroacet-toluidide,
4-amino-1-N-phenyl-omega-chloroacetanilide,
4-amino-1-N-cyclohexyl - omega - chloropropionanilide,
4-amino-1-N-cyclohexyl- omega - bromopropionanilide,
4-amino-1-N-cyclohexyl-α-bromopropionanilide,
4-amino-1-N-cyclohexyl-omega-bromo - acetanilide,
4-amino-2-N-benzyl-omega-chloro-acetanisidide,
4-amino-1-N-cyclohexyl - omega - chloroacetanilide-2-sulphonic acid,
3-amino-1-N-benzyl-omega-chloropropionanilide (obtainable by methods described in British Patent 544,409 or our U. S. Patent No. 2,346,492, 4-amino-1-N-β-ethoxyethyl-omega - chloroacetanilide (obtainable by acetylating N-β-ethoxyethylaniline, nitrating, removing the acetyl group by hydrolysis, causing the resulting 4-nitro-1-N-β-ethoxyethylaniline to react with chloroacetyl chloride and reducing), and 4-amino-1-N-cyclohexyl-omega-chloroacetanilide-2-sulphonic acid (obtainable by chloroacetylating sodium 4-nitro-1-N-cyclohexylaniline-2-sulphonate and reducing).

As examples of coupling components which can be used according to the invention, are mentioned the following:

2-N-acetylamino-8-naphthol-6-sulphonic acid
2-N-propionylamino-8-naphthol-6-sulphonic acid
2-N-n-butyrylamino - 8 - naphthol - 6 - sulphonic acid 2-N-iso-butyrylamino-8-naphthol-6-sulphonic acid 2-N-acetyl-N-methylamino-8-naphthol-6-sulphonic acid 2-N-acetyl-N-ethylamino-8-naphthol-6-sulphonic acid 2-N-acetyl-N-β-hydroxyethylamino-8-naphthol-6-sulphonic acid 2-N-acetyl-N-γ-hydroxy-n-propylamino-8-naphthol-6-sulphonic acid 2-N-acetyl-N-phenylamino-8-naphthol-6-sulphonic acid The second, third and fourth compounds in the above list are obtainable by interaction between sodium 2-amino-8-naphthol-6-sulphonate and propionic, n-butyric and iso-butyric anhydrides respectively.

The following examples, in which the parts are by weight, illustrate but do not limit the invention.

*Example 1*

21.25 parts of 4-amino-1-N-ethyl-omega-chloroacetanilide are dissolved in a mixture of 300 parts of water and 25 parts of 36% hydrochloric acid. 6.9 parts of sodium nitrite are added. The diazonium compound so-obtained, after cooling to 5–10° C., is added to a stirred and cooled mixture of 30.3 parts of 2-N-acetylamino-8-naphthol-6-sulphonate, 40 parts of sodium chloride, 400 parts of water and 21 parts of anhydrous sodium carbonate. When coupling is complete more sodium chloride is added, the mixture stirred for several hours and the new dyestuff filtered off and dried.

The new dyestuff is red in colour and dissolves in water with a yellowish red colour and in concentrated sulphuric acid with a red colour. It dyes wool from a dye-bath containing sulphuric acid and Glauber's salt in scarlet-red shades, the dyeings having very good fastness to severe washing, milling and perspiration, and good fastness to light.

The above coupling may also be carried out in the presence of sodium acetate or sodium bicarbonate or other similar mild acid-binding agent.

*Example 2*

21.25 parts of 4-amino-1-N-ethyl-omega-chloroacetanilide are diazotised as in Example 1. The solution of the diazo compound so-obtained is cooled to 5–10° C. and added to a stirred and cooled mixture of 32 parts of sodium 2-N-acetyl-N-methylamino-8-naphthol-6-sulphonate, 600 parts of water, 40 parts of sodium chloride and 21 parts of anhydrous sodium carbonate. When coupling is complete a further 100 parts of sodium chloride are added. After stirring for several hours, the precipitated dyestuff is filtered off, washed with 20% sodium chloride solution, and dried.

The new dyestuff is red-brown, dissolving in water with a yellowish red colour and in concentrated sulphuric acid with a very bluish red colour. It dyes wool from a dyebath containing sulphuric acid and Glauber's salt in brownish red shades, the dyeings having very good fastness to severe washing and milling, and good fastness to light.

*Example 3*

22.65 parts of 4-amino-1-N-ethyl-omega-chloropropionanilide are dissolved in a mixture of 300 parts of water and 25 parts of 36% hydrochloric acid. 6.9 parts of sodium nitrite are added. The resulting diazonium compound is added gradually to a stirred mixture of 30.3 parts of sodium 2-N-acetylamino-8-naphthol-6-sulphonate, 500 parts of water and 28 parts of crystalline sodium acetate, the temperature being maintained at 10°–15° C. When coupling is complete sodium chloride is added as necessary to precipitate the dyestuff which is then filtered off, washed with 5–10% aqueous sodium chloride, and dried.

The new dyestuff dyes wool from a dyebath containing sulphuric acid and Glauber's salt in yellowish red shades, the dyeings having good fastness to severe washing, milling and light.

If the sodium 2-N-acetylamino-8-naphthol-6-sulphonate employed above is replaced by the equivalent amount of sodium 2-N-n-butyrylamino-8-naphthol-6-sulphonate a dyestuff having similar properties is obtained.

*Example 4*

To a solution of 28.65 parts of sodium 3-amino-omega-chloroacetanilide-4-sulphonate in 450 parts of water there are added 35 parts of 36% hydrochloric acid, followed by 6.9 parts of sodium nitrite. The diazonium solution so-obtained is added to a stirred solution at 10°–15° C. of 30.3 parts of sodium 2-N-acetylamino-8-naphthol-6-sulphonate in 400 parts of water containing 28 parts of crystalline sodium acetate. The new dyestuff is precipitated by addition of sufficient sodium chloride to give a 20–25% solution, filtered off, washed with 20% aqueous sodium chloride and dried.

The dyestuff dyes wool from an acid bath in scarlet shades, the dyeings having good fastness to severe washing, milling and light.

A dyestuff having similar properties is obtained if coupling is carried out in the presence of sodium bicarbonate instead of sodium acetate.

*Example 5*

24 parts of 4-amino-2-N-ethyl-omega-chloropropiontoluidide are dissolved in 350 parts of water and 25 parts of 36% hydrochloric acid. 6.9 parts of sodium nitrite are added.

The resulting diazonium solution is added to a stirred mixture of 30.3 parts of sodium 2-N-acetylamino-8-napthol-6-sulphonate, 350 parts of water and 28 parts of crystalline sodium acetate. When coupling is complete 50 parts of sodium chloride are added and the precipitated dyestuff filtered off, washed with 5% aqueous sodium chloride and dried.

The new dyestuff dyes wool from a dyebath containing sulphuric acid and Glauber's salt in red shades of good fastness to severe washing, milling and light.

Dyestuffs having very similar properties are obtained if 28.5 parts of 4-amino-2-N-ethyl-omega-bromopropion-toluidide or of 4-amino-2-N-ethyl-α-bromopropion-toluidide are substituted for the 4-amino-2-N-ethyl-omega-chloropropion-toluidide used above.

*Example 6*

22.65 parts of 4-amino-1-N-iso-propyl-omega-chloroacetanilide are dissolved in a mixture of 300 parts of water and 25 parts of 36% hydrochloric acid. 6.9 parts of sodium nitrite are added. The diazonium solution so-obtained is cooled to 10° C. and added gradually to a stirred solution at 10°–15° C. of 30.5 parts of sodium 2-N-acetylamino-8-naphthol-6-sulphonate in 500 parts of water to which 28 parts of sodium acetate crystals have been added. When coupling is complete 150 parts of sodium chloride are added to precipitate the new dyestuff which is then filtered off, washed with 10% aqueous sodium chloride and dried.

The new dyestuff dyes wool from an acid bath in bright yellowish red shades, the dyeings having very good fastness to severe washing, milling and light.

Dyestuffs having similar properties are obtained if the 4-amino-1-N-iso-propyl-omega-chloroacetanilide used above is replaced by 24.05 parts of 4-amino-1-N-sec.butyl-omega-chloroacetanilide or if the sodium 2-N-acetylamino-8-naphthol-6-sulphonate is replaced by 33.3 parts of sodium 2-N-iso-butyrylamino-8-naphthol-6-sulphonate.

*Example 7*

27.45 parts of 3-amino-1-N-benzyl-omega-chloroacetanilide are dissolved in 400 parts of water containing 25 parts of 36% hydrochloric acid and cooled to 5–10° C. 6.9 parts of sodium nitrite are added. The diazonium solution, after filtration if necessary, is gradually added to a solution at 5–7° C. of 30.3 parts of sodium 2-N-acetyl-amino-8-naphthol-6-sulphonate in 400 parts of water containing 21 parts of anhydrous sodium carbonate and 40 parts of sodium chloride. Coupling is rapid and, when complete, further sodium chloride is added as necessary to separate the dyestuff which is filtered off and dried.

The new dyestuff dyes wool from an acid bath in yellowish red shades, the dyeings having very good fastness to severe washing and milling, and good fastness to light.

*Example 8*

26.65 parts of 4-amino-1-N-cyclohexyl-omega-chloroacetanilide as dissolved in 400 parts of water and 25 parts of 36% hydrochloric acid and diazotised at 15–30° C. by the addition of 7.0 parts of sodium nitrite. The diazonium solution, after filtration if necessary, is cooled to 5–10° C. and added gradually to a stirred and cooled solution of 30.3 parts of sodium 2-N-acetylamino-8-naphthol-6-sulphonate in 400 parts of water containing 21 parts of anhydrous sodium carbonate and 40 parts of sodium chloride. Coupling is rapid and, when complete, the dyestuff is filtered off and dried.

The new dyestuff dyes wool from an acid bath in scarlet-red shades of very good fastness to severe washing and milling, and good fastness to light.

The coupling may also be carried out in the presence of other mild neutralising agents, such as sodium bicarbonate or sodium acetate.

*Example 9*

If in Example 8, instead of the sodium 2-N-acetylamino-8-naphthol-6-sulphonate there are employed 31.7 parts of sodium 2-N-propionyl-amino-8-naphthol-6-sulphonate, a dyestuff having very similar properties is obtained.

*Example 10*

If in Example 8, instead of the sodium 2-N-acetylamino-8-naphthol-6-sulphonate there are employed 33.1 parts of sodium 2-N-n-butyrylam-ino-8-naphthol-6-sulphonate, a dyestuff is obtained having similar properties.

*Example 11*

26.65 parts of 4-amino-1-N-cyclohexyl-omega-chloroacetanilide are diazotised in the manner described in Example 2. The diazonium solution is added gradually to a stirred solution at 10°–15° C. of 31.7 parts of sodium 2-N-acetyl-N-methyl-amino-8-naphthol-6-sulphonate in 450 parts of water containing 28 parts of crystalline sodium acetate. Stirring is continued until coupling is complete. The dyestuff is then filtered off, washed with 5% aqueous sodium chloride and dried.

The new dyestuff is reddish brown, dissolving in water to an orange-brown solution and in concentrated sulphuric acid to a brownish red solution. It dyes wool from a dyebath containing sulphuric acid and Glauber's salt in bright red-brown shades of very good fastness to severe washing and milling and good fastness to light.

Dyestuffs having similar properties are obtained if the sodium 2-N-acetyl-N-methylamino-8-naphthol-6-sulphonate used above is replaced by the equivalent amount of sodium 2-N-acetyl-N-ethylamino-8-naphthol-6-sulphonate or 2-N-acetyl-N-β-hydroxyethylamino-8-naphthol-6-sulphonate.

*Example 12*

25.65 parts of 4-amino-1-N-β-ethoxyethyl-omega-chloroacetanilide dissolved in 250 parts of water and 25 parts of 36% hydrochloric acid is diazotised by the addition of 6.9 parts of sodium nitrite. The diazonium solution is added gradually at 10°–15° C. to a stirred and similarly cooled mixture of 30.3 parts of sodium 2-N-acetyl-amino-8-naphthol-6-sulphonate, 28 parts of crystalline sodium acetate and 350 parts of water. Stirring is continued until coupling is complete. 60 parts of sodium chloride are added and the dyestuff filtered off, washed with 10% aqueous sodium chloride and dried.

The new dyestuff is bright scarlet and dissolves in water to give a reddish orange solution and in concentrated sulphuric acid to give a yellowish red solution. It dyes wool from an acid dyebath in yellowish red shades, the dyeings having very good fastness to severe washing and milling and good fastness to light.

*Example 13*

28.05 parts of 4-amino-1-N-cyclohexyl-omega-chloro-propionanilide are dissolved with warming in 150 parts of water and 35 parts of 36% hydrochloric acid and 150 parts of water added. Diazotisation is effected at 20°–25° C. by the addition of 7 parts of sodium nitrite. The filtered solution of the diazonium compound is cooled to 10°–15° C. and added with stirring to a similarly cooled mixture of 30.3 parts of sodium 2-N-acetylamino-8-naphthol-6-sulphonate, 400 parts of water and 45 parts of crystalline sodium acetate. Stirring is continued until coupling is complete. The dyestuff is precipitated by the addition of sodium chloride as necessary, filtered off and dried. The new dyestuff dyes wool from an acid bath in yellowish red shades, the dyeings having good fastness to severe washing, milling and light.

If the sodium 2-N-acetylamino-8-naphthol-6-sulphonate used above is replaced by an equivalent amount of sodium 2-N-acetyl-N-methylam-ino-8-naphthol-6-sulphonate or 2-N-acetyl-N-β-hydroxyethylamino-8-naphthol-6-sulphonate, dyestuffs are obtained which yield red-brown dyeings on wool of similar fastness properties.

Dyestuffs having similar fastness properties are also obtained if the 4-amino-1-N-omega-chloro-propionanilide is replaced by the equivalent amount of 4-amino-1-N-omega-bromopropionan-ilide or 4-amino-1-N-α-bromopropionanilide.

The invention is further illustrated by the examples listed in the following table:

| Example No. | Diazo component | Coupling component | Acid-binding agent | Shade on wool |
|---|---|---|---|---|
| 14 | 4-amino-1-N-benzyl-omega-chloroacetanilide | 2-N-acetylamino-8-naphthol-6-sulphonate | Sodium acetate | Yellowish red. |
| 15 | 4-amino-2-N-benzyl-omega-chloroacettoluidide | ...do... | ...do... | Do. |
| 16 | 4-amino-2-N-benzyl-omega-chloroacetanisidide | ...do... | Sodium carbonate | Red. |
| 17 | 4-amino-1-N-phenyl-omega-chloroacetanilide | ...do... | Sodium acetate | Dull red. |
| 18 | 5-amino-2-N-cyclohexyl-omega-chloroacettoluidide | ...do... | ...do... | Yellowish red. |
| 19 | 4-amino-1-N-cyclohexyl-omega-chloroacetanilide-2-sulphonic-acid | ...do... | Sodium carbonate | Do. |
| 20 | 3-amino-1-N-benzyl-omega-chloropropionanilide | 2-N-iso-butyrylamino-8-naphthol-6-sulphonic acid | Sodium acetate | Do. |
| 21 | ...do... | 2-N-acetyl-N-methylamino-8-naphthol-6-sulphonic acid | Sodium carbonate | Red-brown. |
| 22 | 4-amino-2-N-ethyl-omega-chloroacettoluidide | 2-N-acetylamino-8-naphthol-6-sulphonic acid | Sodium acetate | Yellowish red. |
| 23 | 4-amino-1-N-ethyl-omega-chloroacetanilide | 2-N-acetyl-N-β-hydroxyethylamino-8-naphthol-6-sulphonic acid | Sodium carbonate | Reddish brown. |
| 24 | ...do... | 2-N-acetyl-N-γ-hydroxypropylamino-8-naphthol-6-sulphonic acid | Sodium acetate | Do. |
| 25 | 4-amino-2-N-ethyl-omega-chloroacettoluidide | 2-N-acetyl-N-phenylamino-8-naphthol-6-sulphonic acid | Sodium carbonate | Do. |
| 26 | 4-amino-1-N-n-butyl-omega-chloroacetanilide | 2-N-acetylamino-8-naphthol-6-sulphonic acid | Sodium acetate | Yellowish red. |
| 27 | 4-amino-1-N-ethyl-omega-chloropropion-anilide | 2-N-acetyl-N-ethylamino-8-naphthol-6-sulphonic acid | ...do... | Reddish brown. |

We claim:

1. A monazo dyestuff which in the form of its acid is represented by the formula

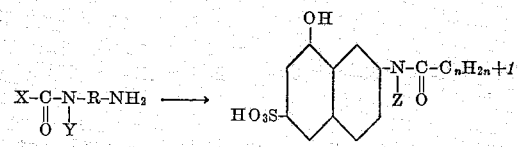

wherein —R—NH$_2$ is an arylene nucleus of the group consisting of anilino, toluidino and anisidino nuclei substituted in the meta- or para-position by the group X—CO—NY—; X is a mono-halogenoalkyl group having 1 to 3 carbons in which halogen is one of the group consisting of chlorine and bromine; Y is one of the group consisting of hydrogen, lower alkyl, benzyl, cyclohexyl, lower alkoxyalkyl and phenyl; Z is one of the group consisting of hydrogen, lower alkyl, lower mono-hydroxyalkyl and phenyl; and $n$ is 1 to 3.

2. A monazo dyestuff in accordance with claim 1 in which the coupling component is 2-N-acetyl-amino-8-naphthol-6-sulfonic acid.

3. The monazo dye which in the form of its acid is represented by the formula

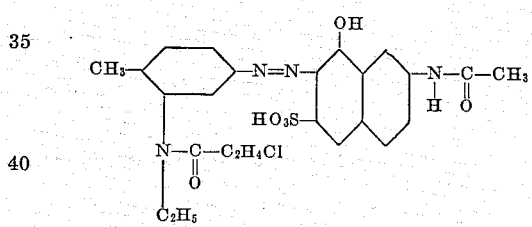

4. The monazo dye which in the form of its acid is represented by the formula

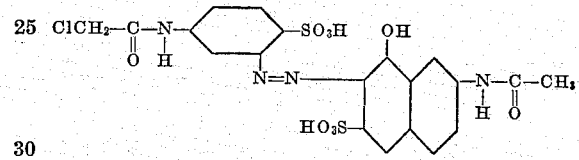

5. The monazo dye which in the form of its acid is represented by the formula

ARTHUR HOWARD KNIGHT.
WILLIAM ELLIOT STEPHEN.